United States Patent
Matsumoto et al.

(10) Patent No.: US 9,053,716 B1
(45) Date of Patent: Jun. 9, 2015

(54) SPOT SIZE CONVERTER WITH A PLURALITY OF BRANCHES FOR HAMR HEADS

(71) Applicant: HGST Netherlands B.V., Amsterdam (NL)

(72) Inventors: Takuya Matsumoto, Sunnyvale, CA (US); Shen Ren, Union City, CA (US); Barry C. Stipe, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/271,743

(22) Filed: May 7, 2014

(51) Int. Cl.
G11B 11/00 (2006.01)
G11B 5/31 (2006.01)
G11B 5/02 (2006.01)

(52) U.S. Cl.
CPC .. G11B 5/314 (2013.01); G11B 5/02 (2013.01)

(58) Field of Classification Search
CPC .................................................. G11B 2005/0032
USPC .................................. 369/13.33, 13.32, 13.13
See application file for complete search history.

(56) References Cited

U.S. PATENT DOCUMENTS

| 8,098,547 | B2 | 1/2012 | Komura et al. | |
|---|---|---|---|---|
| 8,170,389 | B1* | 5/2012 | Komura et al. | 385/129 |
| 8,194,509 | B2 | 6/2012 | Shimazawa et al. | |
| 8,243,561 | B2 | 8/2012 | Matsumoto | |
| 8,264,919 | B2 | 9/2012 | Komura et al. | |
| 8,400,887 | B2 | 3/2013 | Iwanabe et al. | |
| 8,406,093 | B2 | 3/2013 | Iwanabe et al. | |
| 8,441,895 | B2 | 5/2013 | Shimazawa et al. | |
| 8,619,511 | B1 | 12/2013 | Iwanabe | |
| 2007/0030866 | A1* | 2/2007 | Kim et al. | 369/13.33 |
| 2007/0230288 | A1* | 10/2007 | Nishida et al. | 369/13.13 |
| 2009/0303858 | A1* | 12/2009 | Kuiseko et al. | 369/13.33 |
| 2011/0090770 | A1* | 4/2011 | Iwanabe et al. | 369/13.33 |
| 2011/0205660 | A1* | 8/2011 | Komura et al. | 369/13.33 |
| 2011/0216635 | A1* | 9/2011 | Matsumoto | 369/13.33 |
| 2011/0222184 | A1* | 9/2011 | Komura et al. | 369/13.33 |
| 2011/0292772 | A1* | 12/2011 | Chou et al. | 369/13.33 |
| 2012/0127838 | A1* | 5/2012 | Komura et al. | 369/13.32 |
| 2012/0182842 | A1* | 7/2012 | Iwanabe et al. | 369/13.33 |
| 2012/0327751 | A1* | 12/2012 | Iwanabe et al. | 369/13.33 |
| 2013/0142020 | A1* | 6/2013 | Rawat | 369/13.33 |

OTHER PUBLICATIONS

Hirata, M. et al.: "Light Delivery System for Heat-Assisted Magnetic Recording"; IEEE Transactions on Magnetics; vol. 45, Issue 11; Oct. 2009.

Almeida, V. et al.: "Nanotaper for Compact Mode Conversion"; Optical Letters; vol. 28, No. 15; Dec. 2002.

* cited by examiner

Primary Examiner — Tan X Dinh
(74) Attorney, Agent, or Firm — Patterson & Sheridan, LLP (57) ABSTRACT

Embodiments disclosed herein generally relate to a magnetic write head including a media facing surface and a surface opposite the media facing surface. The magnetic write head also includes a SSC having a first end extending to the surface opposite the media facing surface. The first end of the SSC has at least two tips. The multiple-tipped first end of the SSC is configured to receive a laser beam and the laser beam coupling efficiency is improved by having the multiple-tipped first end.

14 Claims, 7 Drawing Sheets

SPOT SIZE CONVERTER WITH A PLURALITY OF BRANCHES FOR HAMR HEADS

BACKGROUND

1. Field

Embodiments disclosed herein generally relate to data storage systems, and more particularly, to heat-assisted magnetic recording (HAMR) heads.

2. Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources.

Typically, the HAMR head includes two optical components: a microphotonic spot-size converter (SSC) and a near field transducer (NFT). SSC converts a highly-divergent output of an external semiconductor laser diode into a well-confined mode that couples into the NFT. The NFT is a plasmonic nano-antenna that further focuses the light into an ultra-small spot-size for high-density magnetic recording. However, the profile of the laser diode is typically asymmetric in the fast axis, while the mode profile of the SSC is typically symmetric. This intrinsic mismatch in symmetry results in unwanted coupling loss. In addition, the misalignment tolerance between the laser diode and the SSC is small, which increases the assembly cost and reduces manufacturing yield. Therefore, there is a need in the art for an improved HAMR heads.

SUMMARY

Embodiments disclosed herein generally relate to a magnetic write head including a media facing surface and a surface opposite the media facing surface. The magnetic write head also includes a SSC having a first end extending to the surface opposite the media facing surface. The first end of the SSC has at least two tips. The multiple-tipped first end of the SSC is configured to receive a laser beam and the laser beam coupling efficiency is improved by having the multiple-tipped first end.

In one embodiment, a magnetic write head is disclosed. The magnetic write head includes a media facing surface, a surface opposite the media facing surface, a near field transducer, and a spot size converter including a first end at the surface opposite the media facing surface. The spot size converter extends toward the near field transducer and the first end has at least two tips.

In another embodiment, a magnetic write head is disclosed. The magnetic write head includes a media facing surface, a surface opposite the media facing surface, a near field transducer, and a spot size converter. The spot size converter includes a primary waveguide and one or more secondary waveguides, and the primary waveguide is spaced from the secondary waveguides.

In another embodiment, a magnetic recording system is disclosed. The magnetic recording system includes a magnetic media and a magnetic write head. The magnetic write head includes a first surface facing the magnetic media, a second surface opposite the first surface, and a spot size converter having a first end extending to the second surface. The first end has at least two tips.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments disclosed herein generally relate to a magnetic write head including a media facing surface and a surface opposite the media facing surface. The magnetic write head also includes a SSC having a first end extending to the surface opposite the media facing surface. The first end of the SSC has at least two tips. The multiple-tipped first end of the SSC is configured to receive a laser beam and the laser beam coupling efficiency and/or misalignment tolerance is improved by having the multiple-tipped first end.

Figure 1A:
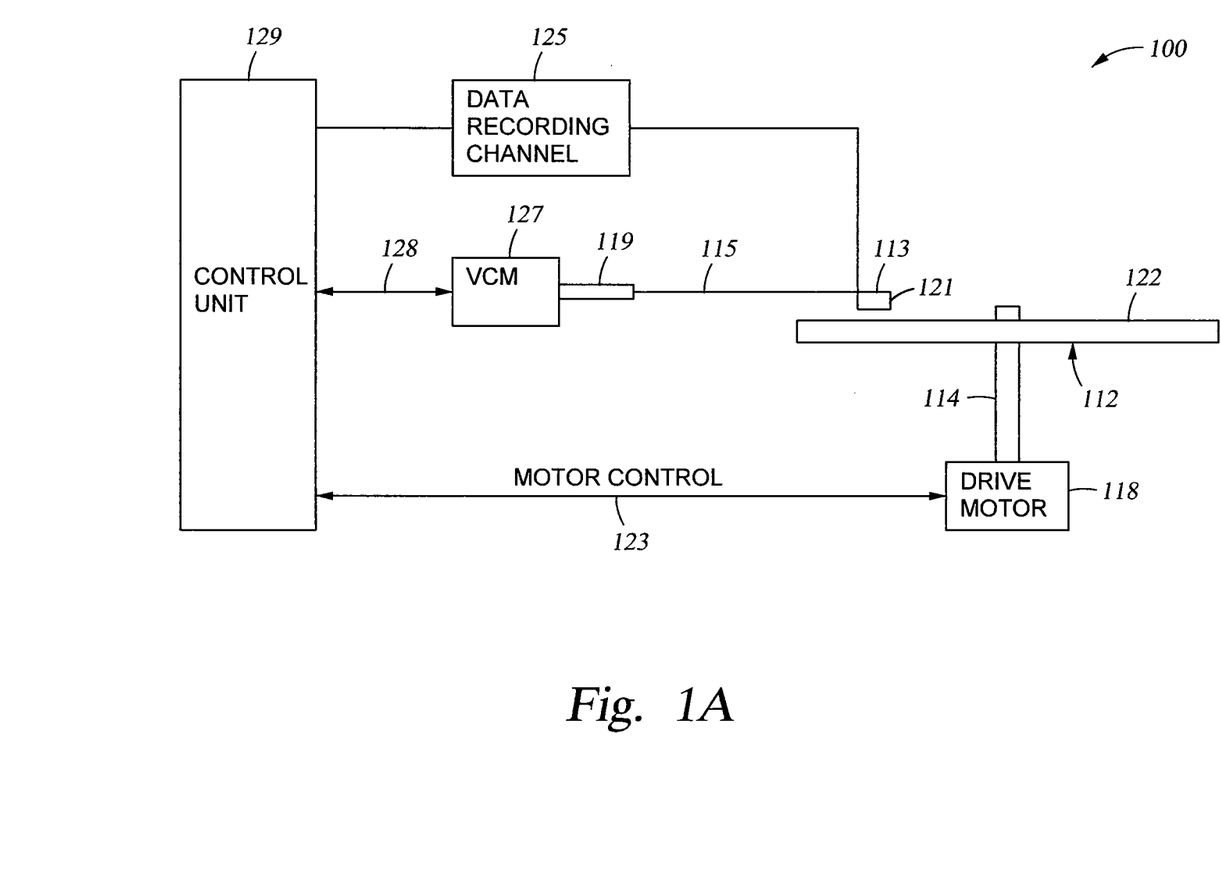
FIGS. 1A-1B illustrate a disk drive system, according to embodiments described herein.

FIG. 1A illustrates a disk drive 100 according to one embodiment disclosed herein. As shown, at least one rotatable magnetic media 112 is supported on a spindle 114 and rotated by a disk drive motor 118. The magnetic recording on each disk is in the form of annular patterns of concentric data tracks (not shown) on the magnetic media 112.

At least one slider 113 is positioned near the magnetic media 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic media 112 generates an air bearing between the slider 113 and the disk surface 122 which exerts an upward force or lift on the slider 113. The air bearing thus counter-balances the slight spring force of suspension 115 and supports slider 113 off and slightly above the media 112 surface by a small, substantially constant spacing during normal operation. The radiation source heats up the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
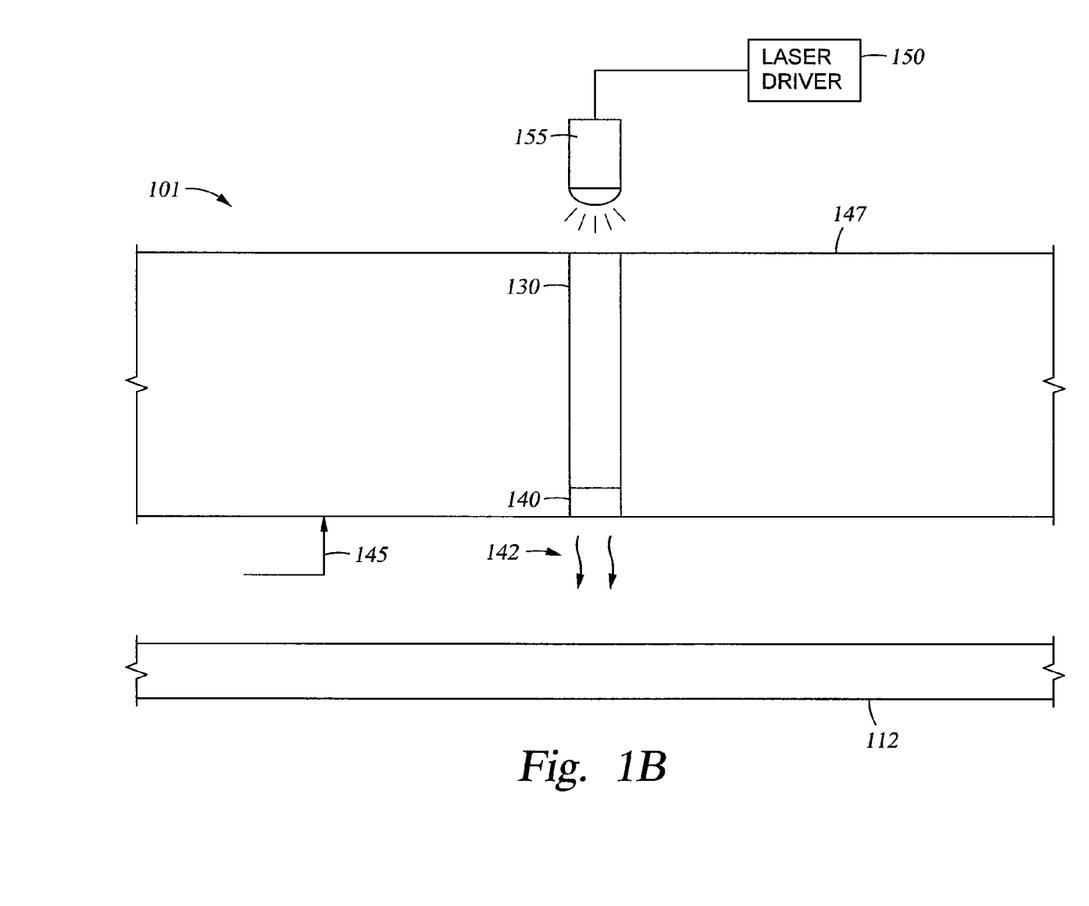

FIG. 1B is a cross sectional schematic of a HAMR enabled write head 101, according to one embodiment described herein. The head 101 is operatively attached to a radiation source 155 (i.e., a laser diode) that is powered by a driver 150. The radiation source 155 may be placed directly on the head 101 or radiation may be delivered from a radiation source 155 located separate from the slider 113 through an optical fiber or waveguide. Similarly, the driver 150 circuitry may be located on the slider 113 or on a system-on-chip (SOC) associated with the disk drive 100 such as the control unit 129 as shown in FIG. 1A. The head 101 includes a media facing surface (MFS) 145 that is facing a magnetic media 112 and a surface 147 that is opposite the MFS 145. The head 101 further includes a SSC 130 for focusing the radiation, such as a laser beam, transmitted by the radiation source 155 into the NFT 140. In some embodiments, a waveguide (not shown) may be disposed between the SSC 130 and the NFT 140. The head 101 may include one or more lens (not shown) for focusing the beamspot of the radiation before the emitted radiation reaches the SSC 130. The NFT 140 may be located at or near the MFS 145, such as an air bearing surface (ABS). The NFT 140 further focuses the beamspot to avoid heating neighboring tracks of data on the magnetic media 112—i.e., creates a beamspot much smaller than the diffraction limit. As shown by arrows 142, this optical energy emits from the NFT 140 to the surface of the magnetic media 112 below the MFS 145 of the head 101. The embodiments herein, however, are not limited to any particular type of radiation emitted from the radiation source to the MFS 145.

Figure 2:
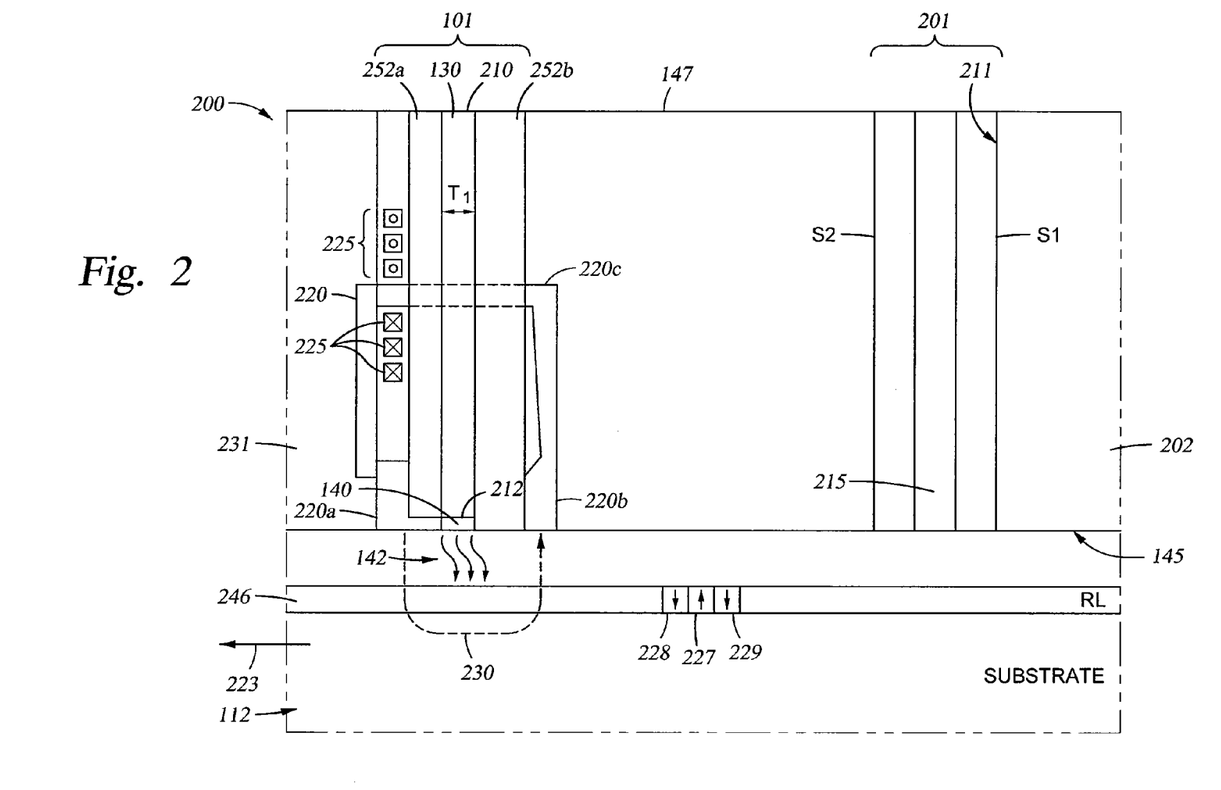
FIG. 2 illustrates a cross-sectional schematic diagram of a HAMR enabled disk drive, according to one embodiment disclosed herein.

FIG. 2 illustrates a cross-sectional schematic diagram of a HAMR enabled disk drive, according to one embodiment disclosed herein. Specifically, FIG. 2 illustrates a portion of a read/write head 200 and associated perpendicular magnetic media 112 for a HAMR disk drive which uses the SSC 130 for directing optical power, e.g., a laser beam, from a radiation source to the NFT 140. The media 112 includes a disk substrate and a perpendicular magnetic recording layer (RL) 246. In one embodiment, the media 112 may include an optional "soft" or relatively low-coercivity magnetically permeable underlayer (SUL). However, the SUL is not required for a HAMR disk drive 100.

The RL 246 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The RL 246 may also be an $L1_0$ ordered alloy such as FePt or FeNiPt. The media 112 may also include a protective overcoat (not shown) over the RL 246.

The read/write head 200 is formed on a substrate 202 and has a substrate trailing surface 211. The MFS 145 may be oriented generally perpendicular to the trailing surface 211. The substrate 202 is typically formed of a composite material, such as a composite of alumina/titanium-carbide ($Al_2O_3$/TiC), and supports the read and write elements which are typically formed as a series of thin films and structures on the trailing surface 211. The media 112 may spin in a direction 223 away from the trailing surface 211 and towards the other layers of the read/write head 200. The MFS 145 is the recording-layer-facing surface of the slider that faces the disk 112. Note that FIG. 2 is not drawn to scale because of the difficulty in showing the very small features and, for the sake of clarity, omits structures from the head such as spacing and insulating layers.

The head/write head 200 includes a read head 201 that includes a magnetoresistive read pole 215 located between shields S1 and S2. The read/write head 200 also includes the write head 101 that includes a magnetic yoke 220 with a write pole 220a and a return pole 220b, and an electrically conductive coil 225. The write pole 220a is formed of a high-moment material, such as a NiFe or FeCoNi alloy. The write coil 225 is wrapped around the yoke 220 with the electrical current directions being shown as into the paper by the coil cross-sections marked with an "X" and out of the paper by the coil cross-sections marked with a solid circle. When write-current pulses are directed through the coil 225, the write pole 220a directs magnetic flux, represented by arrow 230, to the RL 246. Further, the magnetic flux 230 continues through the substrate or a SUL layer before arriving at the return pole 220b. However, the invention is not limited to the structure and material discussed above. For example, the coil 225 may be a helical coil or the write pole 220a may include a wrap-around shield. Further, the embodiments disclosed herein may operate with any recording head that can perform the functions discussed herein.

The write head 101 may also include the SSC 130 and the NFT 140 near or at the MFS 145. As shown, the SSC 130 extends through the yoke 220 and is located between the write pole 220a and the return pole 220b. As noted by the ghosted lines, the yoke 220 may continuously connect the write pole 220a to the return pole 220b with a magnetic member 220c. The SSC 130 and NFT 140 may be fabricated at any location such that the NFT 140 passes over a portion of the spinning magnetic media 112 prior to that portion passing below the write pole 220a. Specifically, the SSC 130 may be located between shield S2 and return pole 220b, or between the write pole 220a and the outer face 231 of the head 201 (if the media 112 rotates opposite of the direction 223 shown).

While writing to the media 112, the RL 246 moves relative to the head 201 in the direction shown by arrow 223, also known as the down track direction (along the x-axis). In a HAMR device, the optical energy 142 emitted from the NFT 140 temporarily heats up and lowers the coercivity ($H_c$) of the RL 246 so that the magnetic recording regions 227, 228, 229 may be oriented by the write field from write pole 220a. The magnetic recording regions 227, 228, 229 become oriented by the write field if the write field ($H_w$) is greater than $H_c$. After a region of the RL 246 in the data track has been exposed to $H_w$ from the write pole 220a and the resulting heat from the optical energy 142 from the NFT 140, the region's temperature falls below the Curie temperature and the data associated with the magnetic orientations is recorded. Specifically, the transitions between recorded regions (such as previously recorded regions 227, 228, and 229) represent written data "bits" that can be read by the read pole 215. In this manner, the NFT 140 uses the optical energy 142 to heat the RL layer 246 and lower its magnetic coercivity.

Figure 3A:
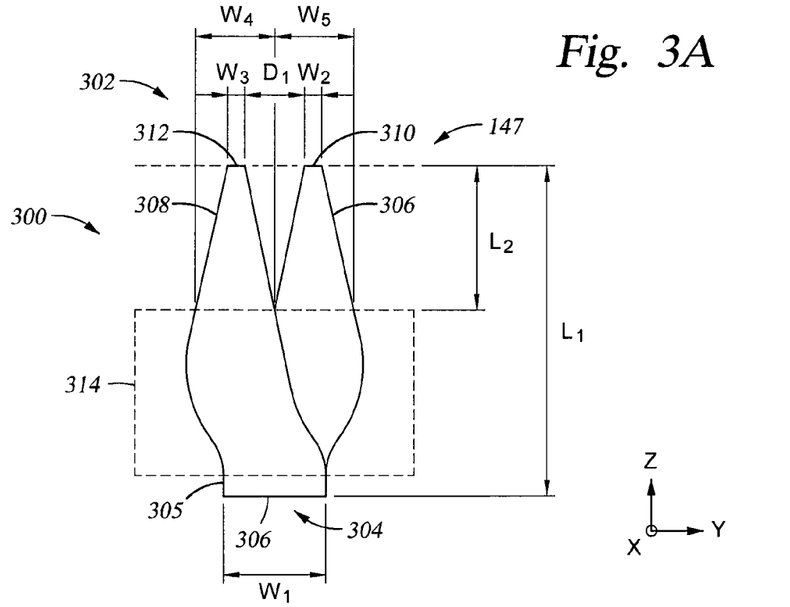
FIGS. 3A-3C illustrate spot size converters according to various embodiments described herein.
Figure 3B:
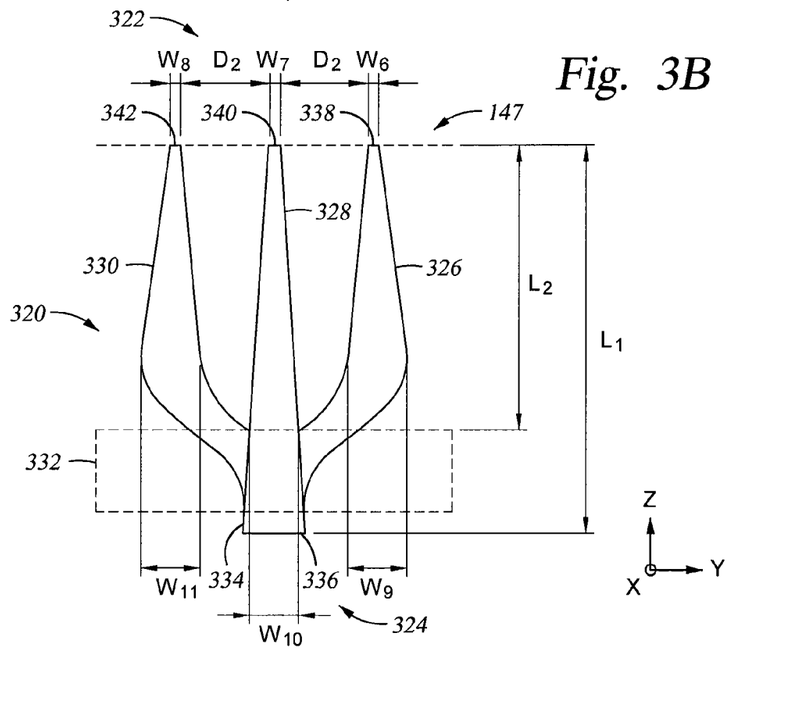
Figure 3C:
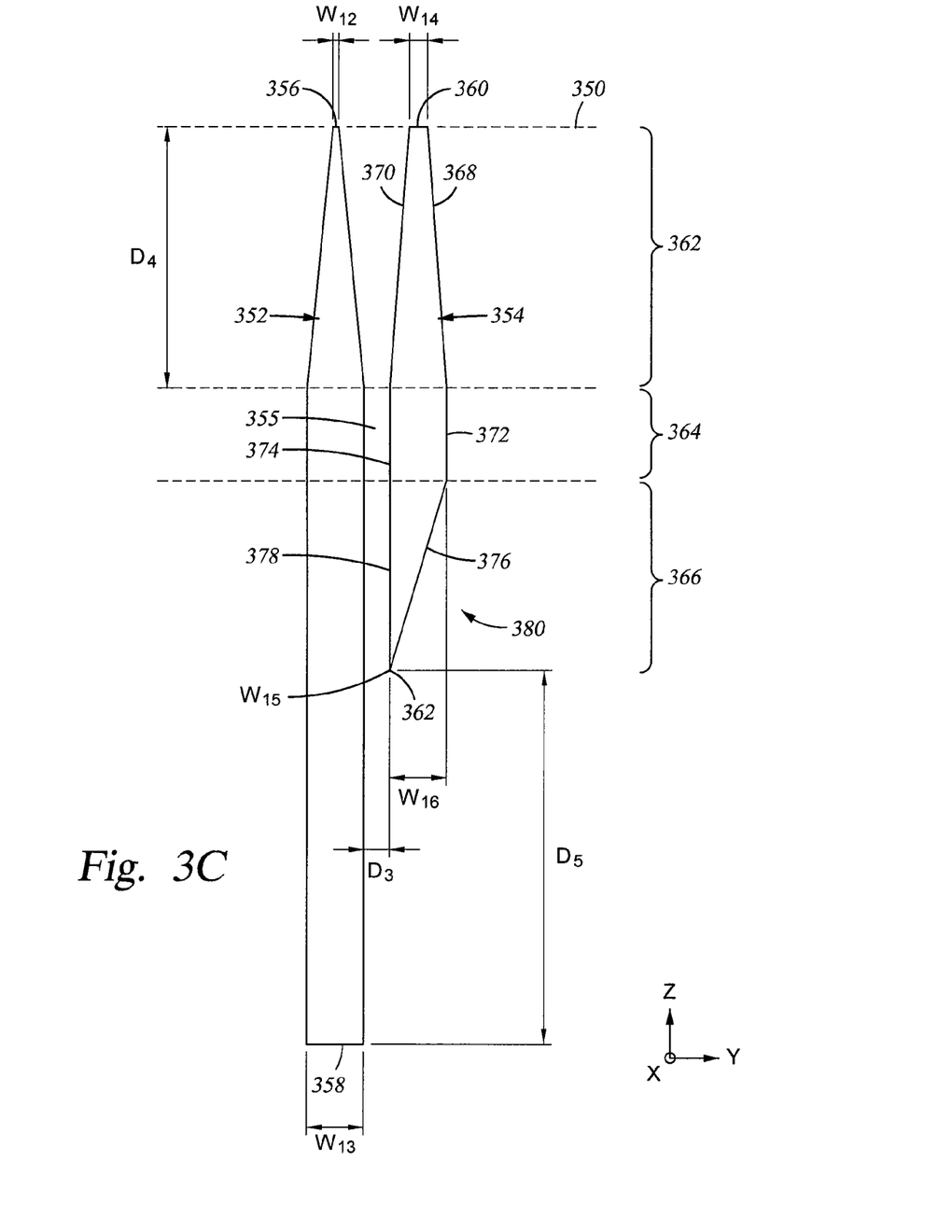

The SSC 130 is formed of a high-index-of-refraction dielectric material that is transmissive to radiation at the wavelength of the laser radiation source—e.g., around 780 nm. Typical radiation-transmissive materials include, for example, $TiO_2$ and $Ta_2O_5$. The radiation-transmissive SSC 130 is surrounded by a cladding material 252a, 252b that has a lower refractive index than the SSC 130, such as $SiO_2$ and $Al_2O_3$. The SSC 130 may have a thickness "T1" of about 300 nm. The SSC 130 may include a first end 210 and a second end 212 that is opposite the first end 210. The first end 210 may extend to the surface 147, and the second end 212 may be recessed from the surface 147. The second end 212 may be disposed proximate the NFT 140. An insulating material (not shown) may be disposed between the second end 212 of the SSC 130 and the NFT 140. The first end 210 may be configured to receive the laser beam from the radiation source 155 (shown in FIG. 1B). Typically the radiation source 155 is an edge-emitting laser diode having an asymmetric profile in the fast axis, and the laser beam from the laser diode may diverge quickly and form a large spot size when reaching the surface 147 of the write head 101. In order to match the asymmetric profile of the laser beam, i.e., to increase the coupling efficiency, and to increase the misalignment tolerance between the radiation source 155 and the SSC 130, the SSC 130 may include at least two branches in the cross track direction (into the paper or along the y-axis) and each branch has a tip at the surface 147. FIGS. 3A-3C illustrate various embodiments of the SSC 130.

FIG. 3A is a side view of a SSC 300 in the cross track direction (along the y-axis) according to one embodiment. The SSC 300 may be the SSC 130 shown in FIG. 1B and FIG. 2. The SSC 300 may have a first end 302 and a second end 304, which may be the first and second ends 210, 212 of the SSC 130, respectively. The first end 302 may be disposed at the surface 147 and the second end 304 may be disposed proximate the NFT 140 shown in FIG. 1B and FIG. 2. The SSC 300 may include at least two branches, such as branches 306, 308, extending from the surface 147 to a combiner region 314, and a single branch 305 extending from the combiner region 314 to the second end 304. The single branch 305 may include a tip 306 at the second end 304 and the tip 306 may have a width "W1" ranging from about 300 nm to about 750 nm. The branches 306, 308 may have tips 310, 312, respectively, disposed at the surface 147, and the tips 310, 312 may be configured to receive the laser beam from the radiation source 155. The branches 306, 308 may be tapered, such that the widths "W2", "W3" at the tips 310, 312, respectively, are the smallest, and the widths "W5", "W4" of the branches 306, 308, respectively, disposed at a location recessed from the surface 147 are the largest. In one embodiment, the widths "W4", "W5" range from about 100 nm to about 500 nm.

The distance "D1" between the tips 310, 312 and the widths of the tips 310, 312 may vary based on the laser beam profile. Since the beam profile is typically asymmetric, the widths of the tips 310, 312 may be different. In one embodiment, the distance "D1" between the tips 310, 312 ranges from about 50 nm to about 120 nm, such as from about 60 nm to about 80 nm. The widths "W2", "W3", of the tips 310, 312, respectively, may range from about 40 nm to about 80 nm. The tips 306, 310, 312 may have a cross section that is rectangular and have a thickness (into the paper or along the x-axis) of about 300 nm. The SSC 300 may have a length "L1" of about 150 microns. The branches 306, 308 may have the same length "L2" that ranges from about 30 microns to about 80 microns. The combiner region 314 may include any suitable combining devices, such as a Y-junction or one or more S-bends.

FIG. 3B is a side view of a SSC 320 in the cross track direction (along the y-axis) according to one embodiment. The SSC 320 may be the SSC 130 shown in FIG. 1B and FIG. 2. The SSC 320 may have a first end 322 and a second end 324, which may be the first and second ends 210, 212 of the SSC 130, respectively. The first end 322 may be disposed at the surface 147 and the second end 324 may be disposed proximate the NFT 140 shown in FIG. 1B and FIG. 2. The SSC 320 may include three branches 326, 328, 330, extending from the surface 147 to a combiner region 332, and a single branch 334 extending from the combiner region 332 to the second end 324. The single branch 334 may include a tip 336 at the second end 324 and the tip 336 may have a width ranging from about 300 nm to about 750 nm. The branches 326, 328, 330 have tips 338, 340, 342, respectively, disposed on the surface 147, and the tips 338, 340, 342 are configured to receive the laser beam from the radiation source 155. The branches 326, 328, 330 may be tapered, such that the widths "W6", "W7", "W8", at the tips 338, 340, 342, respectively, are the smallest, and the widths "W9", "W10", "W11", of the branches 326, 328, 330, respectively, disposed at a location recessed from the surface 147, are the largest. In one embodiment, the widths "W9", "W10", "W11" range from about 300 nm to about 750 nm.

The distance "D2" between the adjacent tips and the widths of the tips 338, 340, 342, may vary based on the laser beam profile. Since the beam profile is typically asymmetric, the widths of the tips 338, 340, 342 may be different. In one embodiment, the distance "D2" between the adjacent tips ranges from about 200 nm to about 1.5 microns. The widths "W6", "W7", "W8" of the tips 338, 340, 342, respectively, may range from about 50 nm to about 120 nm. The tips 336, 338, 340, 342 may have a cross section that is rectangular and have a thickness (into the paper or along the x-axis) of about 300 nm. The SSC 320 may have a length "L1" of about 150 microns. The branches 326, 328, 330 may have the same length "L2" that ranges from about 30 microns to about 80 microns. The combiner region 332 may include any suitable combining devices, such one or more S-bends.

Although FIG. 3A shows a SSC having two tips at the surface 147 and FIG. 3B shows a SSC having three tips at the surface 147, the number of tips at the surface 147 is not limited to two or three. The number of the tips of the SSC at the surface 147 is based on the radiation source 155. In one embodiment, the radiation source 155 includes an array of emitters, such as a vertical-cavity surface-emitting laser (VCSEL) array, the SSC may include one, two, three, or more tips at the surface 147 for each emitter. In one embodiment, the SSC has ten tips at the surface 147.

FIG. 3C is a side view of a SSC 350 in the cross track direction (along the y-axis) according to one embodiment. The SSC 350 may be the SSC 130 shown in FIG. 1B and FIG. 2. Unlike the multi-branched SSCs 300, 350, the SSC 350 has a primary waveguide 352 and one or more secondary waveguides 354 that are separated by a distance "D3." The distance "D3" ranges from about 50 nm to about 200 nm. The SSC 350 functions by squeezing the optical field out of the secondary waveguide 354 into the primary waveguide 352, also known as evanescent merging. A cladding material 355 may be disposed between the primary waveguide 352 and the secondary waveguide 354. The cladding material 355 may be the same as the cladding material 252a, 252b described in FIG. 2. The primary waveguide 352 may have a first end 356 disposed at the surface 147 and a second end 358 disposed proximate the NFT 140 shown in FIG. 1B and FIG. 2. The primary waveguide 352 may have a width "W12" at the first end 356 that ranges from about 50 nm to about 120 nm. The width of the primary waveguide 352 may increase up to a location that is a distance "D4" away from the surface 147. The distance "D4" may range from about 30 microns to about 80 microns. The width "W13" may be substantially constant from the location that is "D4" away from the surface 147 to the second end 358. The width "W13" may range from about 300 nm to about 750 nm.

The secondary waveguide 354 may have a first end 360 and a second end 362 that is opposite the first end 360. The first end 360 may be disposed at the surface 147 and the second end 362 may be recessed from the surface 147 and may be disposed at a location that is a distance "D5" away from the second end 358 of the primary waveguide 352. The distance "D5" may range from about 10 microns to about 50 microns.

The secondary waveguide 354 may have a width "W14" at the end 360 and a width "W15" at the end 362. The width "W14" may range from about 50 nm to about 120 nm and the width "W15" may range from about 30 nm to about 70 nm. The secondary waveguide 354 may include a first portion 362, a second portion 364 and a third portion 366. The first portion 362 may extend to the surface 147 and include two sides 368, 370 that are further way from each other as the sides 368, 370 are further way from the surface 147. The second portion 364 is coupled to the first portion 362 and includes two sides 372, 374 that are substantially parallel to each other. The side 372 may be coupled to the side 368 and the side 374 may be coupled to the side 370. The distance between sides 372, 374, i.e., the width "W16" of the second portion 364, may range from about 100 nm to about 500 nm. The third portion 366 may be coupled to the second portion 364 and may extend to the second end 362. The third portion 366 may include sides 376, 378 that are not parallel to each other. The side 376 may be coupled to the side 372 and the side 378 may be coupled to the side 374. In one embodiment, the side 374 and the side 378 form a linear line, and the side 376 is coupled to the side 378 at the second end 362, forming a point at the second end 362, as shown in FIG. 3C. Thus, the width of the third portion 366 decreases towards the second end 362, forming a taper 380 that squeezes the optical field into the primary waveguide 352 from the secondary waveguide 354. The side 378 may be substantially parallel to the primary waveguide 352, or may be slanted towards the primary waveguide 352.

Figure 4A:
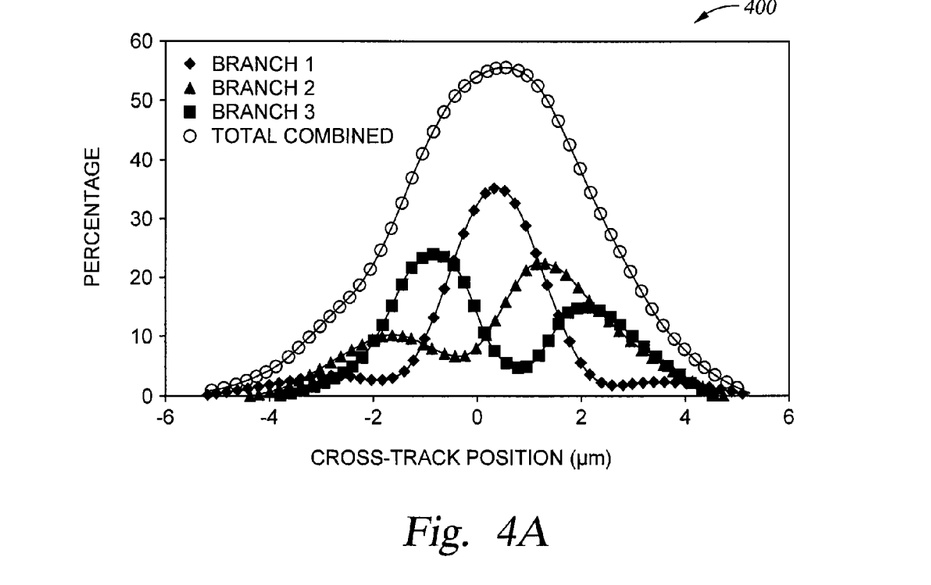
FIGS. 4A-4B are charts showing a relationship between cross-track position and coupling efficiency, according to embodiments described herein.
Figure 4B:
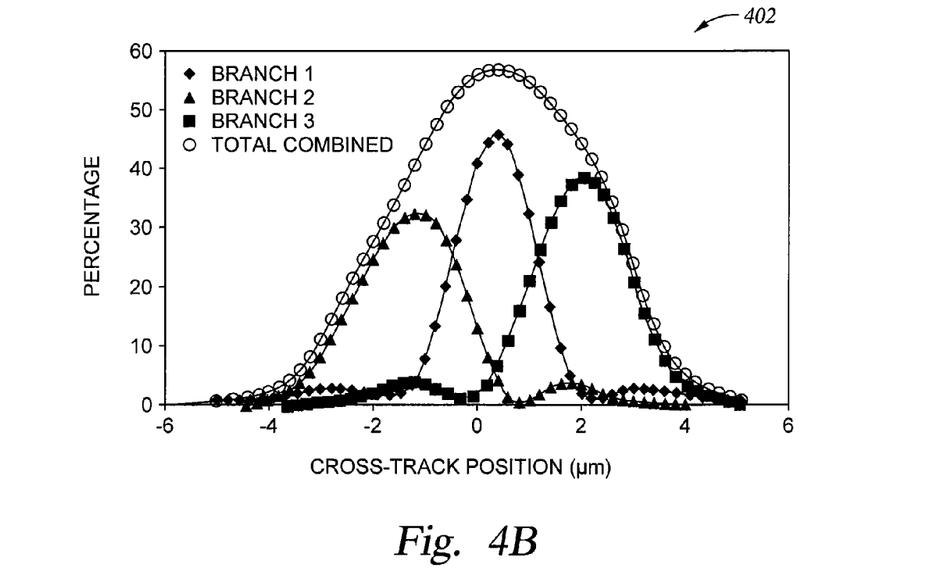

FIGS. 4A-4B are charts 400, 402, showing a relationship between cross-track position and coupling efficiency, according to embodiments described herein. Chart 400 shows coupling efficiencies of a SSC having three branches and the distance between adjacent tips of the branches is about 0.8 microns. As shown in chart 400, each individual branch has a coupling efficiency of at most 38%. But by having three branches, the combined coupling efficiency is almost 60%. Chart 402 shows coupling efficiencies of a SSC having three branches and the distance between adjacent tips of the branches is about 1 micron. As shown in chart 402, each individual branch has a coupling efficiency of at most 48%. But by having three branches, the combined coupling efficiency is almost 60%. Charts 400, 402 illustrate that the misalignment tolerance is improved by having three branches.

Figure 5:
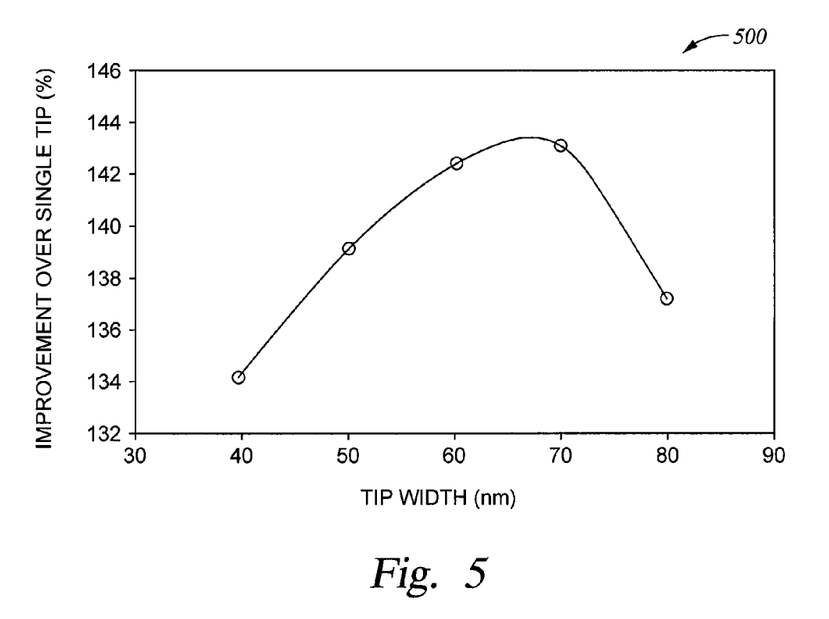
FIG. 5 is a chart showing a relationship between the tip width of a tip in a dual tip spot size converter and the efficiency improvement over single tip spot size converter.

FIG. 5 is a chart 500 showing a relationship between the tip width of a tip in a dual-tip SSC and the efficiency improvement over single tip SSC. The dual-tip SSC may be the SSC 300 shown in FIG. 3A. One tip, such as the tip 310 has a width of about 60 nm. The other tip, such as the tip 312, ranges from about 40 nm to about 80 nm. The resulting improvement over the single-tip SSC is shown in chart 500. As shown in chart 500, the biggest improvement is from a tip having a width of about 60 nm and the other tip having a width of about 70 nm.

In summary, a magnetic write head having a SSC is disclosed. The SSC includes at least two tips at a surface that is opposite the MFS. The multi-tipped SSC helps improving coupling efficiency and misalignment tolerance. The number of tips, the distance between adjacent tips and the width of each tip may be based on the laser profile.

While the foregoing is directed to embodiments of the present invention, other and further embodiments of the invention may be devised without departing from the basic scope thereof, and the scope thereof is determined by the claims that follow.

What is claimed is:
1. A magnetic write head, comprising:
a media facing surface;

a surface opposite the media facing surface;
a near field transducer; and
a spot size converter including a first end at the surface opposite the media facing surface, wherein:
the spot size converter extends toward the near field transducer;
the first end has at least two tips;
the spot size converter has a combiner region;
the spot size converter has at least two branches, the at least two branches being tapered inwards towards the at least two tips, the at least two branches having a first width at the first end and a second width at the combiner region, the second width being greater than the first width; and
the at least two branches extend from the surface opposite the media facing surface to the combiner region.

2. The magnetic write head of claim 1, wherein a distance between the at least two tips ranges from about 50 nm to about 120 nm.

3. The magnetic write head of claim 1, wherein the spot size converter further includes a second end disposed proximate the near field transducer.

4. The magnetic write head of claim 1, wherein the first end of the spot size converter further includes three tips.

5. The magnetic write head of claim 4, wherein a distance between adjacent tips ranges from about 200 nm to about 1.5 microns.

6. The magnetic write head of claim 1, further comprising:
a write pole, and
a return pole, wherein the spot size converter is disposed between the write pole and the return pole.

7. A magnetic write head, comprising:
a media facing surface;
a surface opposite the media facing surface;
a near field transducer; and
a spot size converter, wherein the spot size converter includes a primary waveguide and a secondary waveguide, and wherein the primary waveguide is spaced from the secondary waveguide;
wherein the primary waveguide includes a first end at the surface opposite the media facing surface and a second end disposed proximate the near field transducer; and
wherein the secondary waveguide includes a first end at the surface opposite the media facing surface and a second end recessed from the surface opposite the media facing surface.

8. The magnetic write head of claim 7, wherein the second end of the secondary waveguide is a distance away from the second end of the primary waveguide, wherein the distance ranges from about 10 microns to about 50 microns.

9. A magnetic recording system, comprising:
a magnetic media; and
a magnetic write head, wherein the magnetic write head includes:
a first surface facing the magnetic media;
a second surface opposite the first surface; and
a spot size converter having a first end extending to the second surface, wherein:
the first end has at least two tips;
the spot size converter has a combiner region;
the spot size converter has at least two branches, the at least two branches being tapered inwards towards the at least two tips, the at least two branches having a first width at the first end and a second width at the combiner region, the second width being greater than the first width; and
the at least two branches extend from the surface opposite the media facing surface to the combiner region.

10. The magnetic recording system of claim 9, wherein the magnetic write head further includes:
a write pole, and
a return pole, wherein the spot size converter is disposed between the write pole and the return pole.

11. The magnetic recording system of claim 9, wherein a distance between the at least two tips ranges from about 60 nm to about 80 nm.

12. The magnetic recording system of claim 9, wherein the spot size converter further includes a second end disposed proximate the near field transducer.

13. The magnetic recording system of claim 9, wherein the first end of the spot size converter further includes three tips.

14. The magnetic recording system of claim 13, wherein a distance between adjacent tips ranges from about 200 nm to about 1.5 microns.

* * * * *